United States Patent [19]

Johnson et al.

[11] 4,199,754
[45] Apr. 22, 1980

[54] CIRCUIT FOR AN EMERGENCY LIGHTING AND FIRE DETECTOR SYSTEM

[75] Inventors: Robert W. Johnson, Levittown; William J. Raddi, Philadelphia, both of Pa.

[73] Assignee: ESB Incorporated, Wilmington, Del.

[21] Appl. No.: 853,468

[22] Filed: Nov. 21, 1977

[51] Int. Cl.² .................... G08B 17/00; G08B 7/00
[52] U.S. Cl. .................................. 340/577; 340/332; 340/333; 340/509; 340/584; 340/627
[58] Field of Search ............... 340/506, 509, 510, 511, 340/517, 577, 584, 627, 628, 629, 630, 332, 333; 169/23, 60, 61

[56] References Cited

U.S. PATENT DOCUMENTS

| | | | |
|---|---|---|---|
| 3,521,276 | 7/1970 | Raber | 340/509 |
| 3,603,973 | 9/1971 | Hough | 340/584 X |
| 3,678,489 | 7/1972 | Scherban et al. | 340/511 |
| 3,969,720 | 7/1976 | Nishino | 340/332 X |
| 4,004,288 | 1/1977 | Webb, Jr. | 340/628 |
| 4,020,479 | 4/1977 | Conforti et al. | 340/629 X |
| 4,065,759 | 12/1977 | Handing | 340/630 X |
| 4,088,986 | 5/1978 | Boucher | 340/333 X |
| 4,093,943 | 6/1978 | Knight | 340/574 X |
| 4,148,023 | 4/1979 | Elkin | 340/628 |

*Primary Examiner*—John W. Caldwell, Sr.
*Assistant Examiner*—Joseph E. Nowicki
*Attorney, Agent, or Firm*—F. J. Mulligan, Jr.; E. C. MacQueen

[57] ABSTRACT

A circuit for a home safety unit having an emergency light system for providing light in the event of a power failure or when a fire is detected, and a fire detection system for providing an audible alarm indicating the existence of a fire. The circuit includes a battery which is constantly being charged and a low voltage responsive system for indicating a low voltage condition on the battery. A latching system causes the emergency light to be turned off when this low voltage condition is reached, and to remain off until the battery is recharged.

14 Claims, 6 Drawing Figures

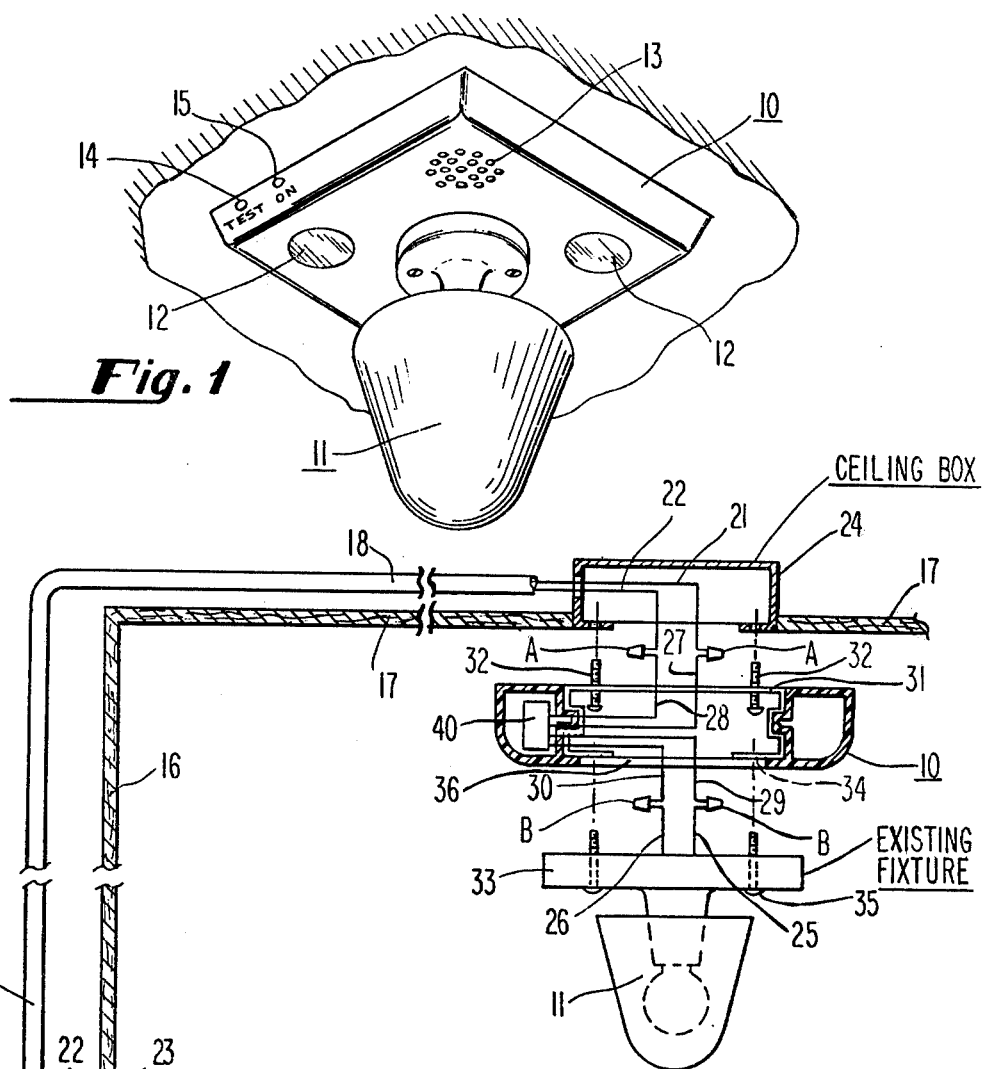
Fig. 1
Fig. 2
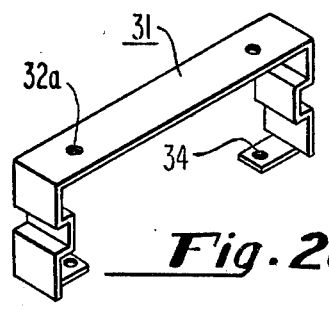
Fig. 2a
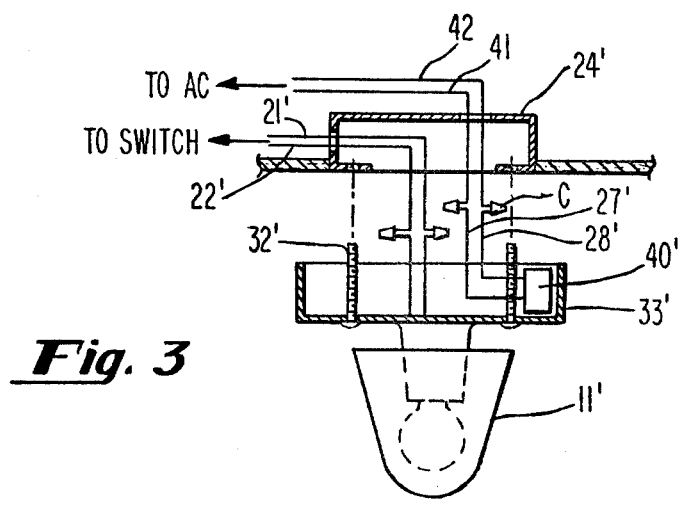
Fig. 3

CIRCUIT FOR AN EMERGENCY LIGHTING AND FIRE DETECTOR SYSTEM

REFERENCE TO RELATED APPLICATIONS

This application relates to a copending application entitled, "Emergency Lighting and Fire Detector System," Ser. No. 853,193, filed of even date herewith by the same inventors. The claims of this copending application relate to the modified light switch aspect and the mounting position.

BACKGROUND OF THE INVENTION

This application is related to emergency lighting systems and fire detector systems, and more specifically to a combination emergency lighting and fire detector unit which can be easily retro-fitted into an existing building.

Fire detector systems are becoming increasingly popular today as the general public becomes aware of the need for such devices. Because of the high demand and large volume of production, the prices of these devices have fallen to well within the range of many households and are in increased demand.

One desirable feature of a fire detector system is to have a battery so that the detector will operate even if the utility power is interrupted. To eliminate the need for frequent battery changes, it is desirable to have rechargeable batteries that are constantly being charged. However, such a system usually requires an external power line connecting the system to the nearest outlet.

Another desirable feature of a fire detector system is to have it designed so that it blends in with the decor of one's home and will not be located out of sight and away from the prime locations for smoke accumulation in the event of a fire.

SUMMARY OF THE INVENTION

In accordance with a preferred embodiment, a circuit is provided for a combination emergency light and fire detector system which enables the safety unit to include the above noted desirable features without the noted problems.

Basically, the circuit includes two switching circuits. The first switching circuit is responsive to an output signal from the fire detector to connect the alarm to the battery. The second switching circuit is responsive to either the voltage and/or current provided to the circuit falling below a specific level, or the detector output signal, to connect the emergency, or auxiliary light across the battery.

Furthermore, a latching circuit is provided to turn off the auxiliary light in the event the battery voltage falls below a predetermined level.

A better understanding of the invention and its advantages can be seen in the following description of the figures and preferred embodiment.

DESCRIPTION OF THE FIGURES & PREFERRED EMBODIMENTS

FIG. 1 is an elevational view of the first embodiment safety unit mounted on a ceiling in conjunction with a conventional light fixture.

FIG. 2 is a schematic illustration of the first embodiment safety unit.

FIG. 2a is an illustration of bracket 31.

FIG. 3 is a schematic illustration of the second embodiment safety unit mounted in the base of a light fixture.

Figure 4:
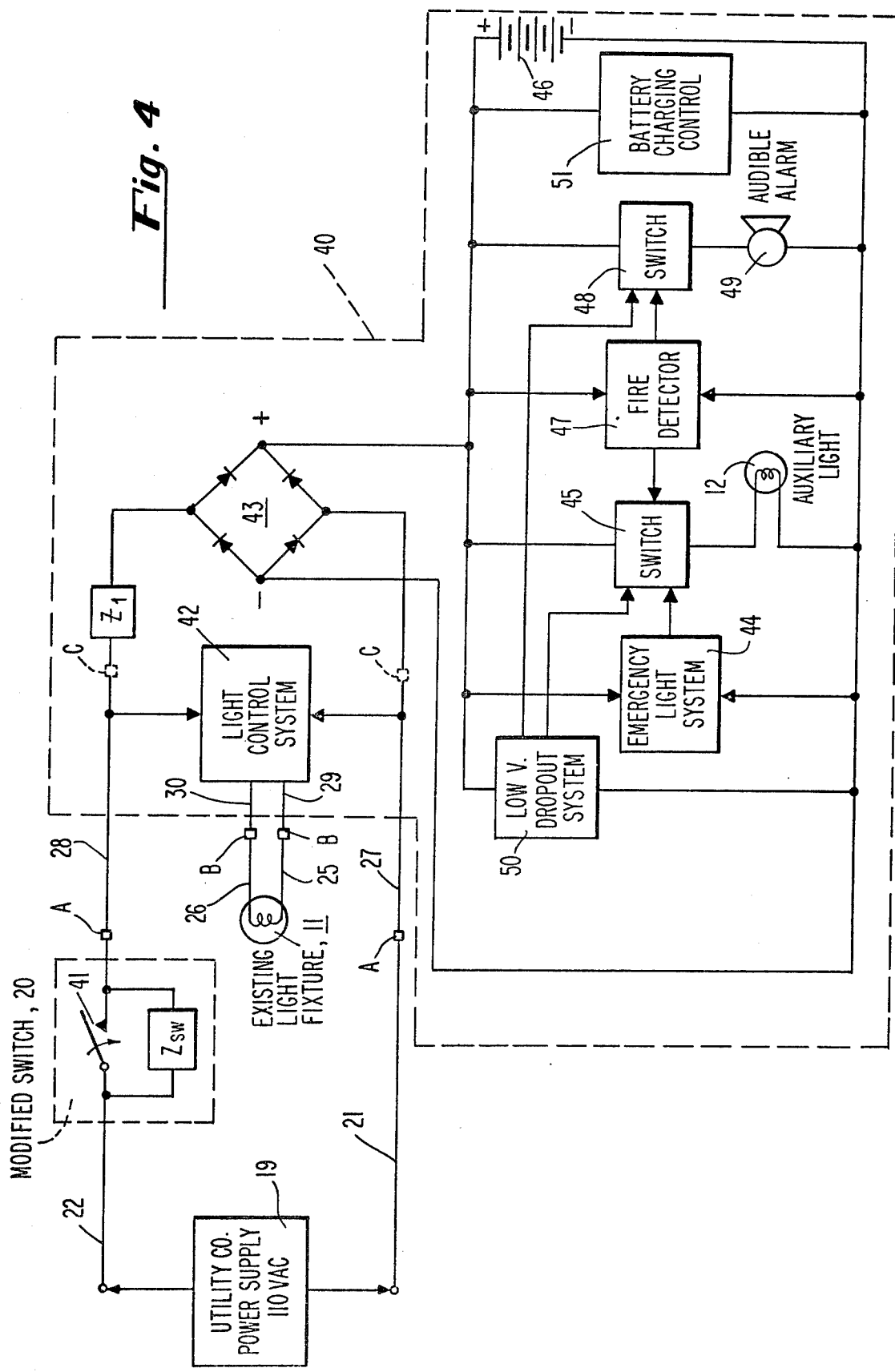
FIG. 4 is a block diagram illustrating the various functions of the safety unit for both embodiments.

Referring to FIG. 1, the safety system unit 10 is preferably a thin-walled housing which can be mounted to a recessed electrical box in a fashion similar to a conventional light fixture. A conventional light fixture 11 is secured to the lower surface of unit 10 in a conventional manner. Recessed in the lower surface of unit housing 10 are auxiliary lights 12 which provide the emergency lighting required in the event of a power failure or a fire condition. A plurality of openings 31 permit entry of air into the fire detector for smoke detection. Test button 14 permits testing of the alarm and auxiliary lights 12. Indicator light 15 provides an indication that the safety unit is receiving power from the household wiring.

Safety unit 10 is shown mounted on a ceiling only by way of example, as it is apparent that installation at other locations, such as a wall, is entirely feasible. Furthermore, it should be noted that the principles behind this invention are equally applicable to any electrical system to be mounted in a similar fashion, for instance, a burglar alarm system.

Referring to FIG. 2, the physical connections of the first embodiment safety unit with the existing wiring will be discussed. In most conventional homes, a two conductor line 18 leads from the house fuse box (not shown), behind wall 16 and ceiling 17, to light fixture 11, with one conductor 22 being interrupted by a wall light switch in electrical box 23. In the retro-fit installation of the first embodiment, the existing wall switch is replaced by modified light switch 20 which has some kind of means for providing auxiliary power to the unit circuitry. The preferred embodiment uses an impedance $Z_{SW}$ connected in parallel with the contact points of switch 20 so that the auxiliary power is sufficient to properly operate this safety unit. Conductors 21 and 22 extend from the wall electrical box 23 of light switch 20 to ceiling electrical box 24. Normally, conductors 21 and 22 would be connected to leads 25 and 26 of light fixture 11. However, when safety unit housing 10 is installed, unit leads 27 and 28 from unit circuitry 40 are connected to conductors 21 and 22 at junction "A" and unit leads 29 and 30 are connected to light fixture leads 25 and 26 at junction "B".

The mechanical mounting of existing light fixture 11 to unit housing 10, and then housing 10 to ceiling box 24, can be by various means. The preferred fastening system is shown in FIG. 2 wherein housing 10 has a "doughnut" shape and wherein an interconnecting bracket 31 is rotatably mounted within center portion 36 of housing 10. Referring to FIG. 2a, bracket 31 has openings 32a on its upper surface through which fastening screws 32 are threaded for connection of safety unit housing 10 to ceiling box 24. The lower surface of interconnecting bracket 31 has threaded openings 34 for receiving screws 35 in base 33 of light fixture 11. For ease of installation, interconnecting bracket 31 should be designed so that the center-lines of threaded openings 32a and 34 are offset, thereby permitting easy access to screws 32 by a screwdriver without interferring with the lower surface of bracket 31. Since bracket 31 rotates within center portion 36, housing 10 can be rotated to be oriented to the desired position during installation.

The second embodiment may be used to avoid the need for modified light switch 20, as is illustrated in FIG. 3, wherein the elements which are the same as in FIG. 2 are identified by the same numerals with a prime designation. This embodiment is designed for new construction installation or retro-fit installation where easy access to a hot line is available.

The safety unit circuitry 40' can be fully contained within base 33' of light fixture 11' as shown in FIG. 3. This variation is applicable to both embodiments even though it is only illustrated for the second embodiment. The combination light fixture 11' is connected directly to conductors 21' and 22' by-passing safety unit circuitry 40'. Conductors 41 and 42, which are connected directly to the household power, are connected to leads 27' and 28' to provide the necessary power for operating safety unit circuitry 40', thereby eliminating the need for the modified light switch. Safety unit circuitry 40' includes the same components as circuitry 40, except for the elimination of switch control system 42, as will be discussed below in more detail.

Referring now to FIG. 4, the various functions performed by the first embodiment safety unit are illustrated in a block diagram form. Conductors 21 and 22 are both connected to the power supplied by the local utility company through the building switch box or fuse box (not shown), symbolized as power supply 19 which provides a line voltage, $V_L$. Safety unit circuitry leads 27 and 28 extend from unit circuitry 40 to connect conductors 21 and 22 at junction "A". Connected in series with lead 22 is modified light switch 20 having its switch 41 in parallel with impedance $Z_{SW}$.

Included within unit circuitry 40 is light control system 42, which controls the operation of existing light fixture 11 in response to light switch 20. Light control system 42 is voltage sensitive so that when switch 41 is closed, normal line voltage is sensed, thereby causing light fixture 11 to become lit. When light switch 41 is opened, $Z_{SW}$ and $Z_1$ act as a voltage divider to reduce the voltage sensed by control system 42 below a predetermined value, thereby preventing the illumination of light fixture 11.

A rectifier 43 provides full wave rectified direct current to the remainder of the safety unit circuitry.

Emergency light system 44 acts in response to the loss of charge current when power supply 19 fails, closing switch 45, which connects auxiliary light 12 across battery 46.

Fire detector system 47 is connected across the terminals of battery 46. Upon detection of a fire condition, it provides a signal to alarm switch 48 which activates audible alarm 49. At the same time, a signal is provided to emergency light switch 45, causing auxiliary light 12 to be illuminated.

To assure that sufficient energy is always available to operate the fire detector 47, low voltage dropout system 50 is provided. Upon detection that the voltage of battery 46 has dropped below a predetermined level, dropout system 50 causes switch 45 to open, thereby preventing further power drain of battery 46 by auxiliary light 12. In the event emergency light system 44 is activated, the battery will not be discharged below a level capable of supplying the power requirements of detector system 47 for several days. In addition to shutting off light 12, dropout system 50 also pulses switch 48 which activates the audible alarm 49 to produce a continuous intermittent beep. This signal also serves to indicate a wornout or defective battery that will not hold a charge.

Depending on the type of battery used for the safety unit, a battery charging control system 51 may be required. Rechargeable batteries such as nickel-cadmium batteries do not usually require any additional battery charger circuitry. However, lead-acid type batteries do require circuitry for controlling the battery terminal voltage to prevent damage to the battery.

For the second embodiment safety unit (FIG. 3), the block diagram of its systems is similar to that shown in FIG. 4, without modified light switch 20 and light control system 42. In other words, the second embodiment includes all circuit systems illustrated in FIG. 4 extending to the right of junction "C", and does not include light control system 42 or modified light switch 20. The power lines are then connected directly to junction "C".

Figure 5:
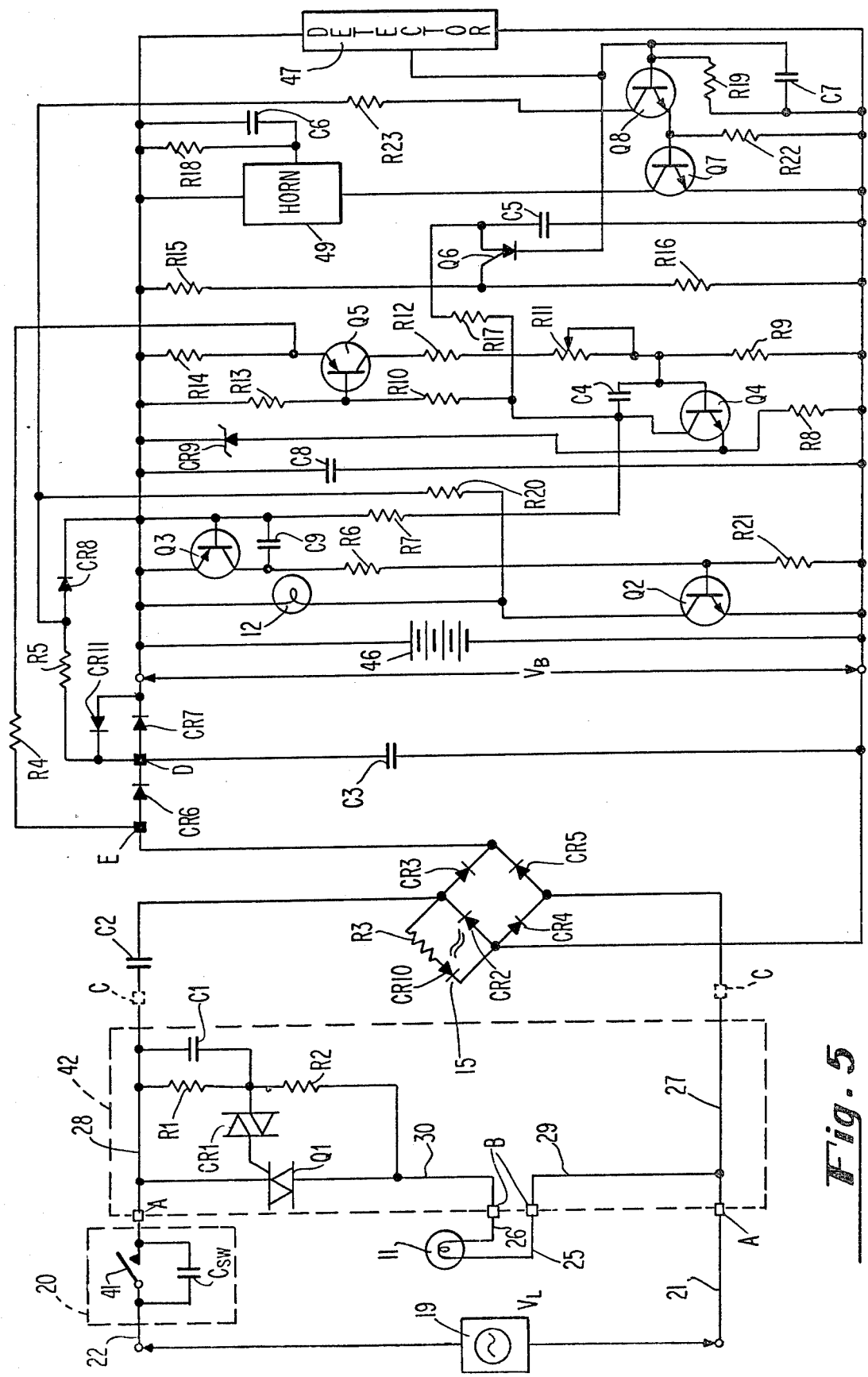
FIG. 5 is a circuit diagram of the safety unit circuitry.

It is noted that while the block diagram illustration provided in FIG. 4 shows the various safety unit systems connected to the DC output of rectifier 43 as being separate systems, the actual circuitry required for implementing the function of these systems can be substantially integrated to minimize manufacturing cost and space requirements. FIG. 5 illustrates one circuit embodiment for accomplishing these various functions.

The elements of light control system 42 and their operation will now be discussed. While other forms of active and passive impedances may be used with appropriate light control systems, impedances $Z_{SW}$ and $Z_1$ are chosen to be capacitive in this example and are identified as $C_{SW}$ and $C_1$ respectively. Referring to FIG. 5, when switch 41 of light switch 20 is placed in its open position, sufficient power still bypasses switch 41 through impedance $C_{SW}$ to operate the components of the safety unit. $C_{SW}$ and $C_1$ act as a voltage divider to provide the proper voltage input to the light control system 42 and to limit the current flowing in rectifier 43.

Light control system 42 has two active elements, diac CR1 and triac Q1. Diac CR1, as is well known in the art, functions in a symmetrical manner to provide a closed circuit when the voltage potential across its terminals reaches a predetermined level, regardless of polarity. Triac Q1 is connected to diac CR1 in such a manner that when CR1 conducts, current flows into the gate terminal of Q1, turning Q1 "on". Light 11 is then connected to power supply 19 and turns on.

When switch 41 is in its open position, capacitors $C_{SW}$ and $C_2$ maintain a sufficient voltage drop to prevent the potential difference across diac CR1 from reaching the predetermined conductance level. During this mode, triac Q1 remains in its non-conducting condition so that light 11 receives no power. However, when switch 41 is closed, capacitor $C_{SW}$ is shorted out and the higher voltage now across light control system 42 produces a sufficient potential difference across diac CR1 to cause it to conduct and trigger triac Q1 into its conducting condition.

During the "on" mode, because the power received is alternating current, triac Q1 is constantly being cycled between its conducting condition and its non-conducting condition. However, diac CR1 is selected to have a threshold voltage wherein the amount of time in which triac Q1 is conducting is much greater than the time when it is not conducting. Therefore, because of this factor and the frequency of the line voltage, the human eye can perceive little or no reduction in the light output. Light control system 42 in conjunction with modified light switch 20 enables the safety unit to be installed with an existing light fixture, thereby eliminating an external power line.

The AC voltage is reduced by C2 and rectified to full wave DC by rectifier 43, which includes diodes CR2, CR3, CR4, and CR5.

To better understand the detailed circuit operation for subsystems 44, 45, 47, 48 and 50, the following chart provides the operating conditions of the active elements for each possible mode of circuit operation:

| Circuit Mode | | Q2 & Q3 (light) | Q4 & Q5 | Q7 & Q8 (Alarm) | Q6 |
|---|---|---|---|---|---|
| 1 | Normal with AC | off | on | off | off |
| 2 | No AC | on | on | off | off |
| 3 | No AC low $V_B$ | off | off | pulsed on | pulsed on |
| 4 | Fire sensed (with or without AC) | on | on | on | off |
| 5 | Fire sensed with AC, but battery removed | off | off | rapid pulsing | pulsed on |
| 6 | Fire sensed no AC and low $V_B$ | off | off | on | pulsed on |
| 7 | Battery removed with AC | off | off | pulsed on | pulsed on |

The elements of unit circuitry 40 which provide the emergency light system 44 will now be discussed.

The illuminating of auxiliary light 12 is controlled by transistor Q2. Q2 is placed in its conducting state by allowing current to flow into its base junction through resistor R6 and Q3, which is in its conducting mode. Auxiliary light 12 is turned off by reducing the current flowing in R6 to zero by turning off Q3, which is accomplished by reducing the potential across the emitter-base junction to a value that is less than that required to maintain conduction (approximately 0.6 V).

In normal operation (AC on and good battery) the voltage at the junction "D" of C3, CR6, CR7, CR11 and R5 will be greater than the battery voltage ($V_B$) by approximately 0.7 volts. Voltage divider elements R5, CR8, R7, Q4 on, and R8 consequently control the base voltage at Q3. When the line voltage from power source 19 ($V_L$) decreases, the voltage at terminal "D" decreases as C3 discharges, resulting in an increase in the base-emitter voltage of Q3. Upon a sufficient drop of $V_L$, the Q3 emitter-base voltage increases sufficiently to turn Q3 on, which turns on Q2 and auxiliary light 12. The auxiliary light is now connected across battery 46 to provide the necessary power for illuminating light 12.

The actual $V_L$ which will cause light 12 to be turned on depends upon the position of switch 20, which affects the current available for charging C3. When switch 20 is open, a $V_L$ will be higher when light 12 turns on, because less current will be available to maintain the charge on C3.

The operation of low voltage dropout system 50 will now be discussed.

During a power failure, i.e., low voltage or no power condition, light 12 continues to drain the power from battery 46. Failure to disconnect light 12 at some point may result in insufficient power remaining in battery 46 to operate detector 47. Low voltage dropout system 50 is designed to disconnect light 12 from battery 46 when $V_B$ reaches a predetermined low level, for instance, 5.0 volts. This is accomplished by Q4 and Q5 turning off, which causes Q2 and Q3 to turn off. Q4 and Q5 then act as a latch to prevent light 12 from being turned on again until AC power is restored and battery 46 is charged above the predetermined low voltage level.

During the aforementioned operations of emergency light system 44, the condition of the other circuit elements remains virtually unchanged, with Q2, Q3, Q4 and Q5 remaining in their conducting modes. When $V_B$ falls to the predetermined low voltage level, the potential across the Q4 emitter-base junction falls and the Q4 collector voltage rises. Consequently, the Q5 emitter-base junction potential falls below the level for saturating Q5. The Q4 base-emitter potential is then reduced even further, causing Q4 to turn off and then Q5 to turn off.

Now that Q4 is off, the current flowing through voltage divider elements R5, CR8, R7, Q4, and R8 is reduced below that required to drive Q3. Q3 then turns off, along with Q2 and light 12. Q4 and Q5 now remain off until AC power is restored.

An audible signal is also provided to indicate the low voltage level of battery 46. Q7 is activated in a pulsing manner to cause horn 49 to produce an intermittent beeping sound. Q8 serves as an amplifier to Q7. The activation of horn 49 is controlled by programmable unijunction transistor (PUT) Q6. The power for energizing the horn coil is obtained from battery 46 and capacitor C3. As the charge on battery 46 decreases, C3 provides the necessary current to create the required high pulse current at a usable terminal voltage. Between beeps, C3 is gradually charged by battery 46 to provide the current surge for producing the following beep.

The interval between beeps is controlled by the RC circuit of R17 and C5, connected to the anode of Q6. C5 is charged by battery 46 and turns on Q6 when the Q6 anode reaches the voltage level at the Q6 gate (determined by R15 and R16). At this time, Q6 switches to a low impedance state, discharging capacitor C5 into the base-emitter junction of Q8 and then the Q7 base-emitter junction. Q8 and Q7 are placed in a conducting mode momentarily, connecting horn 49 across $V_B$ so that a short beep is produced. As C5 loses its charge, the anode to cathode current of Q6 falls below the value required to maintain the low impedance state and Q6 turns off. C5 is then allowed to charge again, thereby renewing the cycle.

This beeping cycle continues until the AC power is restored and the voltage level provided by battery 46 has risen above the selected low voltage level, in this example 5.0 volts. At this time the charge current flowing through CR6 and CR7 and into battery 46 causes the voltage at junction "E" at the connection of CR3, CR5, CR6 and R4 to be approximately 1.5 volts above the battery voltage, $V_B$.

Voltage divider R4 and R14 causes the Q5 emitter (Q5 is presently OFF) to be raised above the Q5 base (held at $V_B$ by R13) voltage by a sufficient amount to turn Q5 on. If the battery voltage is above the selected low voltage, Q4 then turns on. Q4 and Q5, which form the latch circuit, are now reset. With Q4 conducting, C5 is no longer being charged and, therefore, no trouble signal is sounded. Auxiliary light 12 is also off because the increased voltage at C3 causes Q3 to turn off, as discussed above. The emergency lighting system has now returned to its normal or ready condition while the battery 46 is continuously charged for future use.

In the event of a fire condition and smoke is detected by fire detector 47 (assuming power from supply 19 and battery 46 is charged) a signal is provided from the detector to the Q8 base-emitter junction and then into the Q7 emitter-base junction, causing Q8 and Q7 to assume their conducting state. Horn 49 is continuously connected across battery 46 and provides an audible signal that a fire condition exists.

At the same time, the voltage level at the Q3 base is reduced by the voltage divider R5 and R23 and conducting Q8 and Q7. This divider is constructed such that the voltage at the Q3 base is sufficient to turn on Q3 and Q2 as previously discussed, which turn on light 12. As a result, when a fire condition is detected by detector 47, an emergency light is provided for helping the building occupants see their way from the building.

Again, as discussed above, should power supply 19 fail and the battery voltage fall to a predetermined low level, light 12 is turned off by turning off Q2, Q3, Q4 and Q5. During the fire condition, the signal provided by fire detector 47 overrides that provided by Q6 so a continuous blast of alarm 49 continues until battery 46 wears out or the smoke dissipates. However, should battery 46 fail and AC power from supply 19 continue, Q2, Q3, Q4 and Q5 would become non-conducting, but Q7 and Q8 would conduct intermittently causing horn 49 to beep rapidly. This is due to the fact that the charge current is not sufficient to operate the horn continuously in this circuit. However, one could easily increase the charge current to permit continuous horn operation.

A further safety feature is provided which discourages one from removing the battery from the safety unit and forgetting to replace it, thereby absent-mindedly leaving the system inoperable in the event a power failure occurs. Once battery 46 is removed from the circuit, $V_B$ without the battery rises, causing C3 to charge to a higher voltage than normal. The only regulation provided is zener CR9 which clamps the voltage $V_B$. The emitter voltage of Q4 rises above that on the base of Q4 because all the charge current flows through CR9 and R8. This increase in emitter voltage causes Q4 to become non-conducting, which in turn causes Q5 to become non-conducting. R17 (dominating element) and C4 then control the switching of Q6 to cause horn 49 to beep intermittently. The energy for beeping horn 49 is supplied by C3, which is charged now by the AC power that is converted to DC by rectifier 43, instead of battery 46. Once a new battery is inserted and connected up, the voltage levels of zener diode CR9 and $V_B$ fall back to their normal levels to permit Q4 and Q5 to return to their conducting condition. The voltage level on the anode terminal of Q6 returns to its normally low position so that Q6 cannot be turned on to beep horn 49.

Zener diode CR9 also serves the function of protecting the unit circuit elements from high voltage surges. For example, battery 46 could be a 6 volt battery and zener CR9 could be selected to be an 8 volt zener. In this example, zener CR9 would not conduct except when battery 46 is removed from the circuit, since when battery 46 is in the circuit it maintains the $V_B$ at 6 volts or less. However, should battery 46 be removed, CR9 would maintain $V_B$ at about 8 volts, as R8 is very small in value.

A visual indication that power is being supplied to the circuit is provided by resistor R3 and light emitting diode CR10, with LED CR10 mounted on the outside of the unit housing as shown in FIG. 1 to serve as indicator 15.

For purposes of testing the fire alarm 49, a test button or switch 14 is connected internally to the detector. Pressing button 14 simulates a fire condition by providing a signal on the Q8 base as discussed above.

The basic horn system is electro mechanical and includes electromagnetic coil cooperating with mechanical coil contacts (not shown), the latter being the actual source of sound produced by the horn. An RC circuit, R16 and C5, is connected in parallel with the coil to prevent voltage transients from damaging drive transistor Q7.

Other circuit elements which should be noted are capacitors C8, C4, C7 and C9. C8 is used to reduce high frequency noise caused by horn 49 and other switching elments. C4, C7, and C9 are used to modify the frequency responses of the transistors they are associated with.

To summarize, when the unit circuit 40 is in its "normal" or "ready" operating mode, Q2, Q3, Q6, Q7, and Q8 will be in their non-conducting modes and Q4 and Q5 will be in their conducting modes. In the event of a power failure, the base voltage of Q3 falls and turns Q3 and Q2 on. Should the voltage of battery 46 fall below a predetermined low level Q4 is first turned off, causing Q5, Q3 and Q2 to return to their non-conducting modes. At the same time, Q7 and Q8 are pulsed into their conducting mode through Q6, in an intermittent fashion to cause horn 49 to beep. In the event a fire should be detected by detector 47 while the unit is in this condition, light 12 will not be turned on and Q7 and Q8 will be turned on so that a constant alarm signal is provided by horn 49.

If the unit circuitry 40 is in its normal operating condition, the detection of a fire condition by detector 47 causes Q2, Q3, Q7 and Q8 to be turned on, with Q4 and Q5 remaining in their conducting condition until $V_B$ falls to the predetermined low level. Should AC power be interrupted while the fire alarm is sounding, Q2, Q3, Q7 and Q8 will remain in their conducting modes until $V_B$ falls to the predetermined low level. Then Q2, Q3, Q4 and Q5 will become non-conducting and turn off light 12 as the audible alarm continues to sound.

Again, assuming normal operation of the unit circuit 40, should battery 46 be removed from the circuit, Q4 and Q5 will be placed in their non-conducting modes, Q2 and Q3 will remain in their non-conducting mode, and Q6 will proceed to pulse Q7 and Q8 on and off so that horn 49 sounds intermittent beeps.

For the purpose of providing a specific example of the invention, the following parameters (in ohms or microfarads) or part numbers, as applicable, of the circuit components are listed:

| | |
|---|---|
| R1 = 13K | R12 = 2.7K |
| R2 = 10K | R13 = 33K |
| R3 = 820 | R14 = 150 |
| R4 = 51 | R15 = 100K |
| R5 = 100 | R16 = 180K |
| R6 = 220 | R17 = 1.5M |
| R7 = 3.3K | R18 = 470 |
| R8 = 68 | R19 = 470 K |
| R9 = 910 | R20 = 15K |
| R10 = 100K | R21 = 15K |
| R11 = 5K pot | R22 = 15K |
| | R23 = 470 |
| C1 = 0.1 | C6 = 0.1 |
| C2 = 1.0 | C7 = 0.1 |
| C3 = 470 | C8 = 0.1 |
| C4 = 0.1 | C9 = 0.01 |
| C5 = 15 | CSW = 1.0 |
| CR1 - Diac GT-60 | |

-continued

| | | | |
|---|---|---|---|
| CR2 - CR8, CR11 - Diode 1N4001 | | | |
| CR9 - Zener 1N756 | | | |
| CR10 - LED FLV 118 | | | |
| Q1 | Q2004F41 | Q5 | 2N4403 |
| Q2 | 92PU100 | Q6 | 2N6028 |
| Q3 | 2N4403 | Q7 | 92PU100 |
| Q4 | 2N3711 | Q8 | 2N3711 |

While a particular embodiment of this invention has been shown and described, it is obvious that changes and modifications can be made without departing from the true spirit and scope of the invention.

It is the intention in the appended Claims to cover all such changes and modifications.

The invention claimed is:

1. A safety system for installation in a building, said system having a fire detector and an emergency lighting system for providing light when building electrical power to the safety system is interrupted or fire is detected, said safety system comprising:
   (a) a rectifying means connected to the building electrical power for converting it to direct current;
   (b) at least one battery;
   (c) means for connecting at least one battery to the rectifying means so that it is charged;
   (d) fire detector means connected across the at least one battery, said fire detector means producing an output signal upon sensing of a fire;
   (e) audible alarm means;
   (f) first switching means, responsive to the output signal from the fire detector, for connecting the alarm means across the at least one battery to activate the alarm when a fire is detected;
   (g) auxiliary light means; and
   (h) second switching means, responsive to the voltage and/or current level of the direct current output from the rectifying means, for connecting the auxiliary light means across the at least one battery when said voltage and/or current level falls below a predetermined low level, said second switching means also responsive to the detector output signal for connecting the auxiliary light means across the at least one battery to provide lighting when fire is detected.

2. The safety system recited in claim 1, further comprising latching means, responsive to the battery voltage, for latching the second switching means in its open circuit condition when the battery voltage falls below a predetermined low voltage level so that the auxiliary light means is maintained disconnected from the at least one battery and is not illuminated.

3. The safety system recited in claim 2, further comprising means, responsive to the latching means latching the second switching means in its open circuit condition, for producing actuating pulses; and further wherein the first switching means is also responsive to said actuating pulses so that when a low battery voltage condition exists, the audible alarm is activated in a pulsed manner.

4. The safety system recited in claim 3, wherein the second switching means comprises:
   (a) a first transistor, responsive to the system voltage and/or current level obtaining the predetermined low level, or to the detector output signal, to obtain a conducting mode;
   (b) a second transistor, connected between the auxiliary light and the battery, said second transistor being responsive to the first transistor obtaining a conducting condition to itself to obtain a conducting condition, thereby causing the auxiliary light to be turned on.

5. The safety system recited in claim 4, wherein the means for producing alarm actuating pulses comprises:
   (a) a programmable unijunction transistor (PUT) with its cathode connected to the first switching means;
   (b) voltage divider means for establishing a predetermined reference voltage on the gate of the PUT; and
   (c) an R-C circuit for accumulating a charge on the anode of the PUT, whereby the PUT assumes a conducting state when the anode voltage equals the gate voltage, allowing the accumulated charge to actuate the first switching means to sound the alarm means until the PUT is turned off.

6. The safety system recited in claim 5, wherein the alarm means comprises an electromechanical horn having an electromagnetic coil cooperating with mechanical coil contacts, and further wherein additional impedance is connected in parallel with the electromagnetic coil to reduce line surges caused by activation of the alarm means, which may damage the first switching means.

7. The safety system recited in claim 6, wherein the additional impedance is a parallel R-C circuit.

8. The safety system recited in claim 1, wherein the second switching means comprises:
   (a) a first transistor, responsive to the system voltage and/or current level obtaining the predetermined low level, or to the detector output signal, to obtain a conducting mode;
   (b) a second transistor, connected between the auxiliary light and the battery, said second transistor being responsive to the first transistor obtaining a conducting condition to itself to obtain a conducting condition, thereby causing the auxiliary light to be turned on.

9. The safety system recited in claim 3 wherein the means for producing alarm actuating pulses comprises:
   (a) a programmable unijunction transistor (PUT) with its cathode connected to the first switching means;
   (b) voltage divider means for establishing a predetermined reference voltage on the gate of the PUT; and
   (c) an R-C circuit for accumulating a charge on the anode of the PUT, whereby the PUT assumes a conducting state when the anode voltage equals the gate voltage, allowing the accumulated charge to actuate the first switching means to sound the alarm means until the PUT is turned off.

10. The safety system recited in claim 1, wherein the alarm means comprises an electromechanical horn having an electromagnetic coil cooperating with mechanical coil contacts and further wherein additional impedance is connected in parallel with the electromagnetic coil to reduce line surges caused by activation of the alarm means, which may damage the first switching means.

11. A safety system for installation in a building, said system having a fire detector and an emergency light for providing light for egress from a building when fire is detected, said system comprising:

(a) electrical power supply means operable independently of electrical power supplied to said building;
(b) fire detector means connected to said power supply means, said fire detecting means producing an output signal upon sensing of a fire;
(c) audible alarm means;
(d) first switching means, responsive to the output signal from the fire detector, for connecting the alarm means to the power supply to activate the alarm when a fire is detected;
(e) auxiliary light means; and
(f) second switching means, responsive to the fire detector output signal, for connecting the auxiliary light means to the power supply means to provide continuous emergency light for egress from said building.

12. The safety system recited in claim 11, further comprising latching means, responsive to the voltage of said electrical power supply means, for latching the second switching means in its open circuit condition when said voltage falls below a predetermined voltage level so that the auxiliary light means is maintained disconnected from said electrical power supply means and is not illuminated.

13. The safety system recited in claim 12, further comprising means, responsive to the latching means latching the second switching means in its open circuit condition, for producing actuating pulses; and further wherein the first switching means is also responsive to said actuating pulses so that when a low electrical power supply means voltage condition exists, the audible alarm is activated in a pulsed manner.

14. The safety system recited in claim 13, wherein the means for producing alarm actuating pulses comprises:
(a) a programmable unijunction transistor (PUT) with its cathode connected to the first switching means;
(b) voltage divider means for establishing a predetermined reference voltage on the gate of the PUT; and
(c) an R-C circuit for accumulating a charge on the anode of the PUT, whereby the PUT assumes a conducting state when the anode voltage equals the gate voltage, allowing the accumulated charge to actuate the first switching means to sound the alarm means until the PUT is turned off.

* * * * *